United States Patent
Goto et al.

(10) Patent No.: US 8,139,534 B2
(45) Date of Patent: Mar. 20, 2012

(54) MOBILE COMMUNICATION METHOD, MOBILE COMMUNICATION SYSTEM AND RADIO BASE STATION

(75) Inventors: Yoshikazu Goto, Yokohama (JP); Akihito Hanaki, Yokohama (JP); Takahiro Hayashi, Yokosuka (JP); Junichiro Kawamoto, Tokyo (JP); Yukiko Takagi, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 614 days.

(21) Appl. No.: 12/365,935

(22) Filed: Feb. 5, 2009

(65) Prior Publication Data

US 2009/0201870 A1 Aug. 13, 2009

(30) Foreign Application Priority Data

Feb. 8, 2008 (JP) .................. P2008-029727

(51) Int. Cl.
*H04W 4/00* (2009.01)
*H04L 12/28* (2006.01)
*H04L 1/00* (2006.01)
*H04B 7/185* (2006.01)
*H04B 7/00* (2006.01)

(52) U.S. Cl. ............ 370/329; 370/395.4; 370/318; 370/252; 455/522; 455/69

(58) Field of Classification Search ............ 370/252, 370/318, 329; 455/69, 522
See application file for complete search history.

(56) References Cited

U.S. PATENT DOCUMENTS

| | | | |
|---|---|---|---|
| 7,016,699 B2 | 3/2006 | Koo et al. | |
| 7,515,927 B2* | 4/2009 | Das et al. | 455/522 |
| 7,636,582 B2* | 12/2009 | Bi et al. | 455/522 |
| 7,894,845 B2* | 2/2011 | Usuda et al. | 455/522 |
| 7,995,585 B2* | 8/2011 | Lee et al. | 370/395.4 |
| 2005/0083943 A1* | 4/2005 | Lee et al. | 370/395.4 |
| 2005/0117519 A1* | 6/2005 | Kwak et al. | 370/236 |
| 2005/0220042 A1* | 10/2005 | Chang et al. | 370/278 |
| 2005/0259662 A1* | 11/2005 | Kim et al. | 370/395.4 |
| 2006/0171307 A1* | 8/2006 | Gopalakrishnan et al. | 370/229 |

(Continued)

FOREIGN PATENT DOCUMENTS

JP 2004-507927 A 3/2004

(Continued)

OTHER PUBLICATIONS

Japanese office action issued on Nov. 8, 2011 in the counterpart Japanese patent application.

*Primary Examiner* — Warner Wong
(74) *Attorney, Agent, or Firm* — Marvin A. Motsenbocker; Mots Law, PLLC

(57) ABSTRACT

A mobile communication method according to the present invention includes: controlling, at the radio base station NodeB, the transmission power in the DPCCH by use of an inner loop transmission power control based on a target SIR; transmitting, at the mobile station UE, the uplink packet, at the transmission power in the E-DPDCH, the transmission power being determined based on the SG and the transmission power in the DPCCH; and determining, at the radio base station NodeB, the target SIR, by use of an outer loop transmission power control based on a HARQ transmission number and a reception result of an uplink packet transmission of the HARQ transmission number, the HARQ transmission number indicating what number transmission in the HARQ retransmission control is the uplink packet transmission.

19 Claims, 13 Drawing Sheets

U.S. PATENT DOCUMENTS

| | | | |
|---|---|---|---|
| 2007/0049317 A1* | 3/2007 | Qi et al. | 455/522 |
| 2007/0207827 A1* | 9/2007 | Bi et al. | 455/522 |
| 2008/0002617 A1* | 1/2008 | Peisa et al. | 370/329 |
| 2008/0051126 A1* | 2/2008 | Nagaraj et al. | 455/522 |
| 2008/0207243 A1 | 8/2008 | Usuda et al. | |
| 2009/0161632 A1* | 6/2009 | Palenius et al. | 370/335 |
| 2010/0014487 A1* | 1/2010 | Attar et al. | 370/335 |
| 2010/0238832 A1* | 9/2010 | Gunnarsson et al. | 370/252 |
| 2011/0021239 A1* | 1/2011 | Wakabayashi et al. | 455/522 |

FOREIGN PATENT DOCUMENTS

| | | |
|---|---|---|
| JP | 2006-523072 A | 10/2006 |
| WO | WO 02/17511 A2 | 2/2002 |
| WO | WO 2006/016230 A1 | 2/2006 |
| WO | 2006/098440 A1 | 9/2006 |

* cited by examiner

TargetSIR_now : TARGET SIR IN CURRENT SUB-FRAME
TargetSIR_next : TARGET SIR IN 1 SUB-FRAME AFTER CURRENT SUB-FRAME

FIG. 7

| HARQ TRANSMISSION NUMBER | FIRST TIME (HOWEVER, THIS FIELD IS NOT APPLICABLE WHEN M = 1) | SECOND TIME (HOWEVER, THIS FIELD IS NOT APPLICABLE WHEN M = 1 OR 2) | ... | M TIMES | AFTER M+1 TIMES |
|---|---|---|---|---|---|
| ACK (RECEPTION SUCCEEDS) | −Δdown | −Δdown | ... | −Δdown | SAME SIR AS ONE IMMEDIATELY BEFORE |
| NACK (RECEPTION FAILS) | SAME TARGET SIR AS ONE IMMEDIATELY BEFORE | SAME TARGET SIR AS ONE IMMEDIATELY BEFORE | ... | Δup | Δup |

TargetSIR_now: TARGET SIR IN CURRENT SUB-FRAME
TargetSIR_next: TARGET SIR IN 1 SUB-FRAME AFTER CURRENT SUB-FRAME

FIG. 12

| TRIAL NUMBER | M | Y | 1/M × (1−Y) |
|---|---|---|---|
| 1 | 5 | 0.1 | 0.18 |
| 2 | 4 | 0.1 | 0.225 |
| 3 | 3 | 0.1 | 0.3 |
| 4 | 2 | 0.1 | 0.45 |
| 5 | 2 | 0.01 | 0.495 |
| 6 | 1 | 0.4 | 0.6 |
| 7 | 1 | 0.3 | 0.7 |
| 8 | 1 | 0.2 | 0.8 |
| 9 | 1 | 0.1 | 0.9 |
| 10 | 1 | 0.01 | 0.99 |

FIG. 13

| RATE NUMBER | M | Y | 1/M × (1−Y) | RATE UP TIMER (msec) |
|---|---|---|---|---|
| 1 | 5 | 0.1 | 0.18 | 300 |
| 2 | 4 | 0.1 | 0.225 | 300 |
| 3 | 3 | 0.1 | 0.3 | 300 |
| 4 | 2 | 0.1 | 0.45 | 300 |
| 5 | 2 | 0.01 | 0.495 | 500 |
| 6 | 1 | 0.4 | 0.6 | 1000 |
| 7 | 1 | 0.3 | 0.7 | 1500 |
| 8 | 1 | 0.2 | 0.8 | 2000 |
| 9 | 1 | 0.1 | 0.9 | 4000 |
| 10 | 1 | 0.01 | 0.99 | − |

MOBILE COMMUNICATION METHOD, MOBILE COMMUNICATION SYSTEM AND RADIO BASE STATION

CROSS REFERENCE TO RELATED APPLICATION

This application is based upon and claims the benefit of priority from prior Japanese Patent Application No. 2008-029727, filed on Feb. 8, 2008; the entire contents of which are incorporated herein by reference.

BACKGROUND OF THE INVENTION

1. Field of the Invention

The present invention relates to a mobile communication method, a mobile communication system and a radio base station, in which an uplink packet is transmitted from a mobile station to a radio base station, at a transmission rate corresponding to a granted value notified by the radio base station.

2. Description of the Related Art

As shown in FIG. 1, in a mobile communication system employing an enhanced uplink (EUL) system defined in 3GPP, that is, a high speed uplink packet access (HSUPA) system, a mobile station UE is configured to transmit an uplink packet via an Enhanced Dedicated Physical Data Channel (E-DPDCH) at a transmission rate corresponding to a granted value (SG: Scheduling Grant) notified by a radio base station NodeB.

To be more specific, the mobile station UE is configured to select, with reference to a previously notified table 1 shown in FIG. 1, an E-DCH transport format combination identity (E-TFCI) corresponding to the SG notified by the radio base station NodeB. Then, the mobile station UE transmits the uplink packet (transport block) at a transmission rate corresponding to the E-TFCI, via the E-DPDCH.

Here, the SG (granted value) shows a ratio between a transmission power in an enhanced dedicated physical data channel (E-DPDCH) for transmitting the uplink packet, and a transmission power of an uplink dedicated physical control channel (DPCCH).

In the 3GPP, as the SG, an absolute grant (AG) that indicates the value of the SG itself or a relative grant (RG) that indicates an increase or decrease in the value of the SG (Up/Down/Hold), are defined.

In addition, the aforementioned mobile communication system is configured to guarantee a reception error of the uplink packet in the radio base station NodeB, by use of a hybrid ARQ (HARQ) retransmission control.

With reference to FIG. 2, a description will be given of operations for transmitting an uplink packet from a mobile station UE in the mobile communication system employing the EUL.

In step S1001, a mobile station UE transmits scheduling information (SI) to a radio base station NodeB, and thereby reports the amount of the uplink packet data remaining in the transmission buffer of the mobile station UE, an upper limit value of the transmission power that can be assigned to the E-DPDCH in the mobile station UE, and the like.

In step S1002, a scheduler 10 of the radio base station NodeB determines an SG (AG or RG) to be notified to each mobile station. Here, the scheduler 10 determines the SG based on the SI reported by each mobile station, the entire reception power of the radio base station NodeB, or the like.

In step S1003, the radio base station NodeB notifies the SG (AG or RG) determined in step S1002, to each mobile station UE via an E-DCH absolute grant channel (E-AGCH) or an E-DCH relative grant channel (E-RGCH).

The mobile station UE determines the SG based on the notified AG or RG and then selects an E-TFCI corresponding to the determined SG. Thereafter, in step S1004, the mobile station UE notifies, to the radio base station NodeB, the E-TFCI by use of an E-DCH dedicated physical control channel (E-DPCCH). Then, in step S1005, the mobile station UE transmits the uplink packet to the radio base station NodeB at a transmission rate corresponding to the E-TFCI, via the E-DPDCH.

Furthermore, with reference to FIG. 3, a description will be given of operations for updating a target signal to interference ratio (SIR) used in an inner loop transmission power control in a radio base station NodeB, in the mobile communication system employing the EUL.

As shown in FIG. 3, in step S2001, the radio base station NodeB determines whether the reception of the uplink packet was successful or not (the reception success or the reception failure), by performing a cyclic redundancy check (CRC) in each sub-frame (TTI: Transmission Time Interval).

When the radio base station NodeB determines that the reception of the uplink packet was successful, as shown in step S2002, the radio base station NodeB decreases the target SIR used in the current sub-frame by an amount of $\Delta$ down and then sets the decreased target SIR to be used in the next sub-frame.

On the other hand, when the radio base station NodeB determines that the reception of the uplink data was not successful, as shown in step S2003, the radio base station NodeB increases the target SIR used in the current sub-frame by an amount of $\Delta$ up and then sets the increased target SIR to be used in the next sub-frame.

In step S2004, by use of the updated target SIR, the radio base station NodeB performs the inner loop transmission power control for the transmission power of a DPCCH in the next sub-frame.

Specifically, as shown in FIG. 4, in each sub-frame, the radio base station NodeB is configured to increase the target SIR, by the amount of $\Delta$ up, to be used in the inner loop transmission power control, when the reception of the uplink packet was not successful (CRC: NG).

On the other hand, in each sub-frame, the radio base station NodeB is configured to decrease the target SIR, by the amount of $\Delta$ down, to be used in the inner loop transmission power control, when the reception of the uplink packet was successful (CRC: OK).

In this regard, by setting the relationship between $\Delta$ up and $\Delta$ down as follows (formula 1), the reception quality (BLER: Block Error Rate) of the uplink packet in the radio base station NodeB can be made closer to the target BLER $$\Delta\ \text{down} = -\Delta\ \text{up} \times (\text{target BLER})/(1-\text{target BLER}) \quad \text{(formula 1)}$$

In the example of FIG. 4, the target BLER is "⅛," and the radio base station NodeB increases the target SIR only by the amount of $\Delta$ up, when the reception of the uplink packet is not successful in the TTI #1.

As a result, the target SIR becomes higher, so that the receptions of the uplink packet at the radio base station NodeB are successful seven times in a row from the TTIs #2 to #8.

Here, the radio base station NodeB decreases the target SIR by the amount of $\Delta$ down every time the reception of the uplink packet is successful. Accordingly, the target SIR becomes low in the TTI #9. Thus, the reception of the uplink packet is not successful in the TTI #9, and then, the radio base station NodeB increases the target SIR only by the amount of Δ up.

However, there has been a problem in the conventional mobile communication system employing the EUL, that is, a reception success rate in the radio base station NodeB is not guaranteed, although the transmission rate at a mobile station UE is guaranteed.

SUMMARY OF THE INVENTION

A first aspect of the present invention is summarized as a mobile communication method in which a mobile station transmits an uplink packet at a transmission rate corresponding to a granted value notified by a radio base station, wherein a HARQ retransmission control is employed in a communication of the uplink packet transmitted from the mobile station to the radio base station; the granted value indicates a ratio between a transmission power in an enhanced dedicated physical data channel for transmitting the uplink packet, and a transmission power in an uplink dedicated physical control channel; and the mobile communication method includes: controlling, at the radio base station, the transmission power in the uplink dedicated physical control channel by use of an inner loop transmission power control based on a target reception quality; transmitting, at the mobile station, the uplink packet, at the transmission power in the enhanced dedicated physical data channel, the transmission power being determined based on the granted value and the transmission power in the uplink dedicated physical control channel; and determining, at the radio base station, the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission.

A second aspect of the present invention is summarized as a mobile communication system in which a mobile station transmits an uplink packet at a transmission rate corresponding to a granted value notified by a radio base station, wherein a HARQ retransmission control is employed in a communication of the uplink packet transmitted from the mobile station to the radio base station; the granted value indicates a ratio between a transmission power in an enhanced dedicated physical data channel for transmitting the uplink packet, and a transmission power in an uplink dedicated physical control channel; the radio base station includes: an inner loop transmission power controlling unit configured to control the transmission power in the uplink dedicated physical control channel by use of an inner loop transmission power control based on a target reception quality; and an outer loop transmission power controlling unit configured to determine the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission; and the mobile station is configured to transmit the uplink packet by use of the transmission power in the enhanced dedicated physical data channel, the transmission power being determined based on the granted value and the transmission power in the uplink dedicated physical control channel.

In the second aspect of the present invention, the outer loop transmission power controlling unit may be configured to improve the target reception quality by a predetermined increment amount in each of a sub-frame, when the HARQ transmission number is not less than a target HARQ transmission number, and when the reception result indicates that a reception of the uplink packet is not successful, and the outer loop transmission power controlling unit may be configured not to change the target reception quality in each of the sub-frame, when the HARQ transmission number is less than the target HARQ transmission number, and when the reception result indicates that the reception of the uplink packet is not successful.

In the second aspect of the present invention, the outer loop transmission power controlling unit may be configured to degrade the target reception quality by a predetermined decrement amount in each of a sub-frame, when the HARQ transmission number is not larger than a target HARQ transmission number, and when the reception result indicates that the reception of the uplink packet is successful, and the outer loop transmission power controlling unit may be configured not to change the target reception quality in each of the sub-frame, when the HARQ transmission number is larger than the target HARQ transmission number, and when the reception result indicates that the reception of the uplink packet is successful.

In the second aspect of the present invention, the outer loop transmission power controlling unit may be configured not to change the target reception quality in each of a subframe, when a reception of control information in an enhanced dedicated physical control channel corresponding to the enhanced dedicated physical data channel is not successful.

In the second aspect of the present invention, the outer loop transmission power controlling unit may be configured to determine the target reception quality based on a target HARQ transmission number and a target residual error rate, the target residual error rate showing a ratio of packets failed to be received by the radio base station even when transmitted by the target HARQ transmission number, with respect to the all packets transmitted by the mobile station.

In the second aspect of the present invention, the outer loop transmission power controlling unit may be configured to determine a combination of the target HARQ transmission number and the target residual error rate, in accordance with a minimum guaranteed reception success rate, the number of HARQ active processes in the mobile station, an uplink packet size in a sub-frame unit, and a sub-frame length, when the granted value notified by the radio base station is smaller than a low group threshold.

In the second aspect of the present invention, the outer loop transmission power controlling unit may be configured to use a predetermined combination of the target HARQ transmission number and the target residual error rate, when the granted value notified by the radio base station is larger than a low group threshold but smaller than a high group threshold.

In the second aspect of the present invention, the outer loop transmission power controlling unit may be configured to change a combination of the target HARQ transmission number and the target residual error rate in each of a predetermined period, when the granted value notified by the radio base station is larger than a high group threshold.

In the second aspect of the present invention, the outer loop transmission power controlling unit may be configured to use a predetermined target reception quality, when the granted value notified by the radio base station indicates a request to stop a transmission in the enhanced dedicated physical data channel.

A third aspect of the present invention is summarized as a radio base station used in a mobile communication system in which a mobile station transmits an uplink packet at a transmission rate corresponding to a granted value notified by the radio base station, wherein a HARQ retransmission control is employed for a communication of the uplink packet transmitted from the mobile station to the radio base station; the granted value indicates a ratio between a transmission power in an enhanced dedicated physical data channel for transmitting the uplink packet, and a transmission power in an uplink dedicated physical control channel; the mobile station is configured to transmit the uplink packet by use of the transmission power in the enhanced dedicated physical data channel, the transmission power being determined based on the granted value and the transmission power in the uplink dedicated physical control channel; and the radio base station includes: an inner loop transmission power controlling unit configured to control the transmission power in the uplink dedicated physical control channel by use of an inner loop transmission power control based on a target reception quality; and an outer loop transmission power controlling unit configured to determine the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission.

In the third aspect of the present invention, the outer loop transmission power controlling unit may be configured to improve the target reception quality by a predetermined increment amount in each of a sub-frame, when the HARQ transmission number is not less than a target HARQ transmission number, and when the reception result indicates that a reception of the uplink packet is not successful, and the outer loop transmission power controlling unit may be configured not to change the target reception quality in each of the sub-frame, when the HARQ transmission number is less than the target HARQ transmission number, and when the reception result indicates that the reception of the uplink packet is not successful.

In the third aspect of the present invention, the outer loop transmission power controlling unit may be configured to degrade the target reception quality by a predetermined decrement amount in each of a sub-frame, when the HARQ transmission number is not larger than a target HARQ transmission number, and when the reception result indicates that the reception of the uplink packet is successful, and the outer loop transmission power controlling unit may be configured not to change the target reception quality in each of the sub-frame, when the HARQ transmission number is larger than the target HARQ transmission number, and when the reception result indicates that the reception of the uplink packet is successful.

In the third aspect of the present invention, the outer loop transmission power controlling unit may be configured not to change the target reception quality in each of a sub-frame, when a reception of control information in an enhanced dedicated physical control channel corresponding to the enhanced dedicated physical data channel is not successful.

In the third aspect of the present invention, the outer loop transmission power controlling unit may be configured to determine the target reception quality based on a target HARQ transmission number and a target residual error rate, the target residual error rate showing a ratio of packets failed to be received by the radio base station even when transmitted by the target HARQ transmission number, with respect to the all packets transmitted by the mobile station.

In the third aspect of the present invention, the outer loop transmission power controlling unit may be configured to determine a combination of the target HARQ transmission number and the target residual error rate, in accordance with a minimum guaranteed reception success rate, the number of HARQ active processes in the mobile station, an uplink packet size in a sub-frame unit, and a sub-frame length, when the granted value notified by the radio base station is smaller than a low group threshold.

In the third aspect of the present invention, the outer loop transmission power controlling unit may be configured to use a predetermined combination of the target HARQ transmission number and the target residual error rate, when the granted value notified by the radio base station is larger than a low group threshold but smaller than a high group threshold.

In the third aspect of the present invention, the outer loop transmission power controlling unit may be configured to change a combination of the target HARQ transmission number and the target residual error rate in each of a predetermined period, when the granted value notified by the radio base station is larger than a high group threshold.

In the third aspect of the present invention, the outer loop transmission power controlling unit may be configured to use a predetermined target reception quality, when the granted value notified by the radio base station indicates a request to stop a transmission in the enhanced dedicated physical data channel.

BRIEF DESCRIPTION OF THE DRAWINGS

FIG. 7 is another diagram for describing a method of setting a target SIR used in the inner loop transmission power control in the radio base station according to the first embodiment of the present invention.

FIG. 12 is a diagram for describing operations for adjusting the target HARQ transmission number and the target residual BLER, when an SG belongs to a low group, in the radio base station according to the first embodiment of the present invention.

FIG. 13 is a diagram for describing operations for adjusting the target HARQ transmission number and the target residual BLER, when the SG belongs to a high group in the radio base station according to the first embodiment of the present invention.

DESCRIPTION OF THE EMBODIMENT

Configuration of Mobile Communication System According to the First Embodiment of Present Invention A configuration of a mobile communication system according to a first embodiment of the present invention will be described with reference to FIGS. 5 to 8. The mobile communication system according to the first embodiment employs the EUL and is configured to use the HARQ retransmission control in the uplink packet communications between a radio base station NodeB and a mobile station UE.

Figure 1:
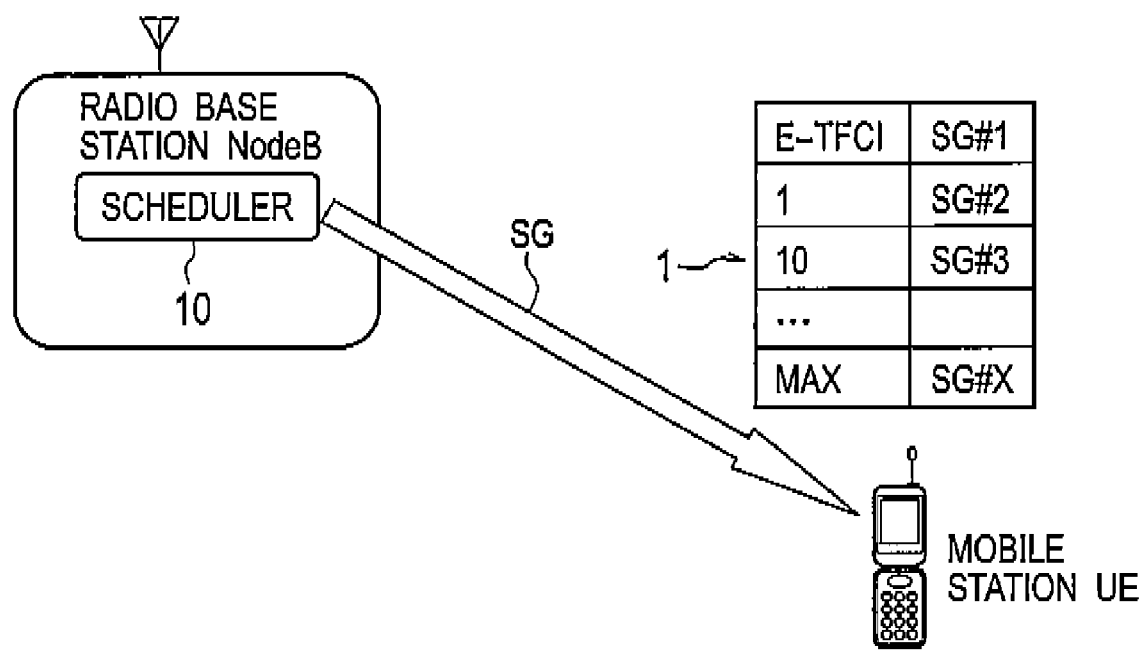
FIG. 1 is a diagram for describing a radio base station used in a conventional mobile communication system employing the EUL.
Figure 2:
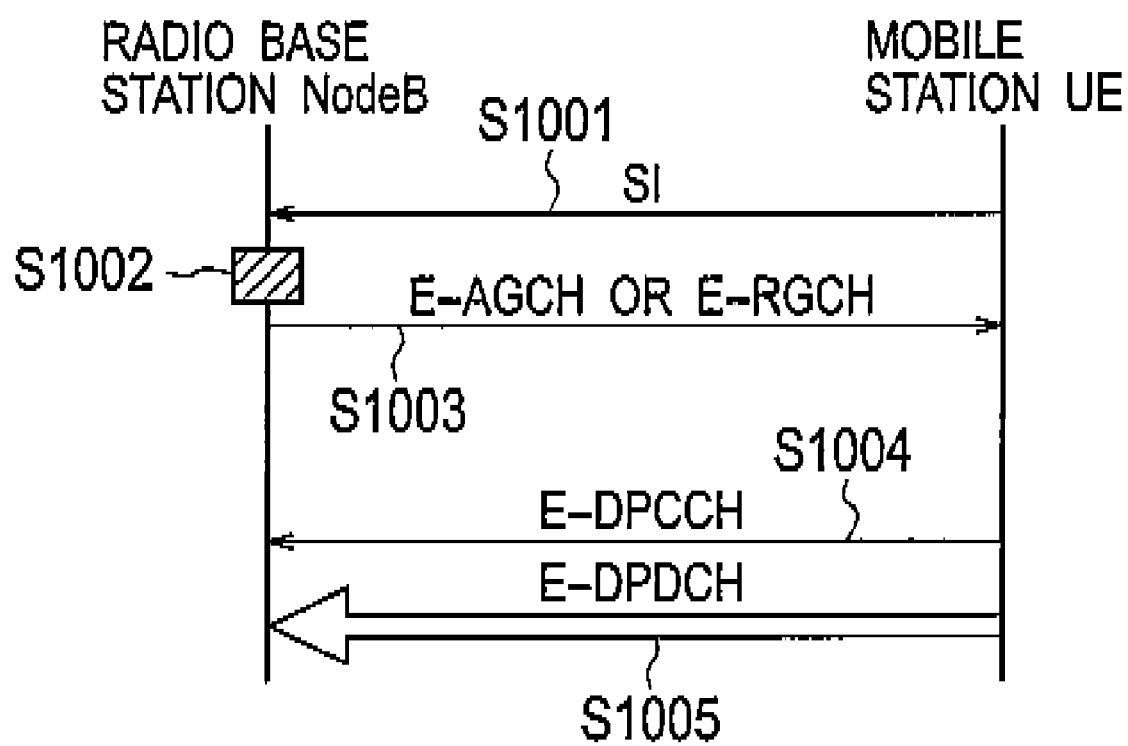
FIG. 2 is a sequence diagram showing operations for controlling a transmission rate of the uplink user data in the conventional mobile communication system employing the EUL.
Figure 3:
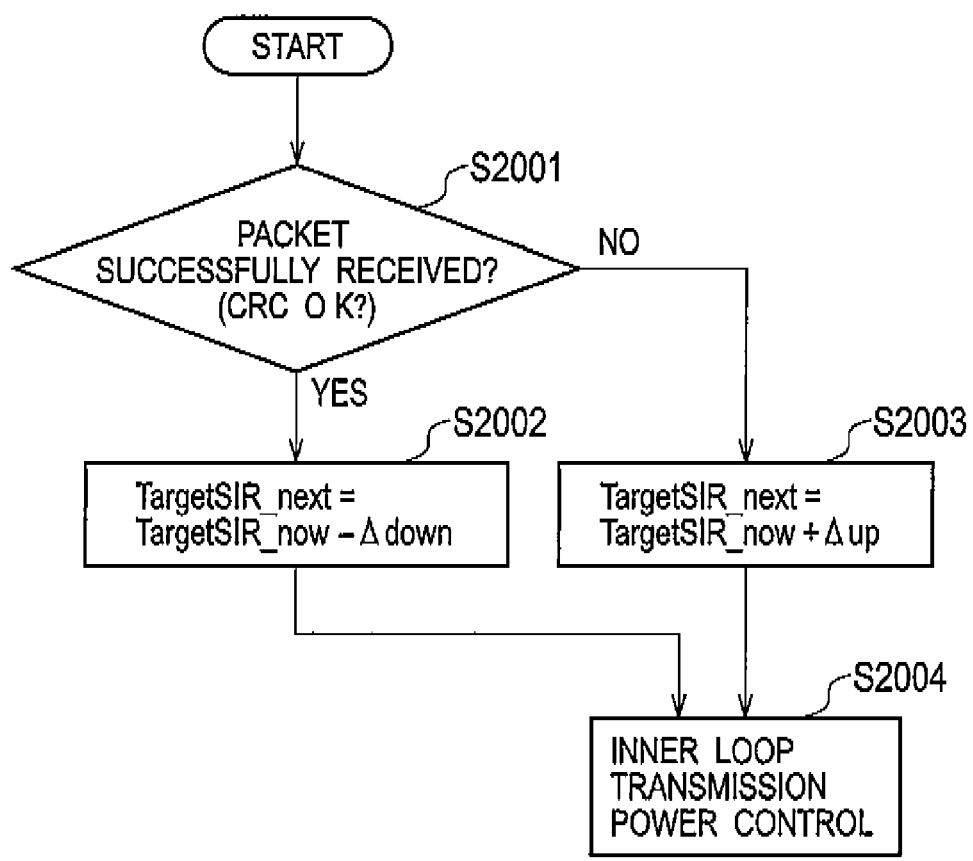
FIG. 3 is a flowchart showing operations for setting a target SIR used in the inner loop transmission power control in the conventional radio base station employing the EUL.
Figure 4:
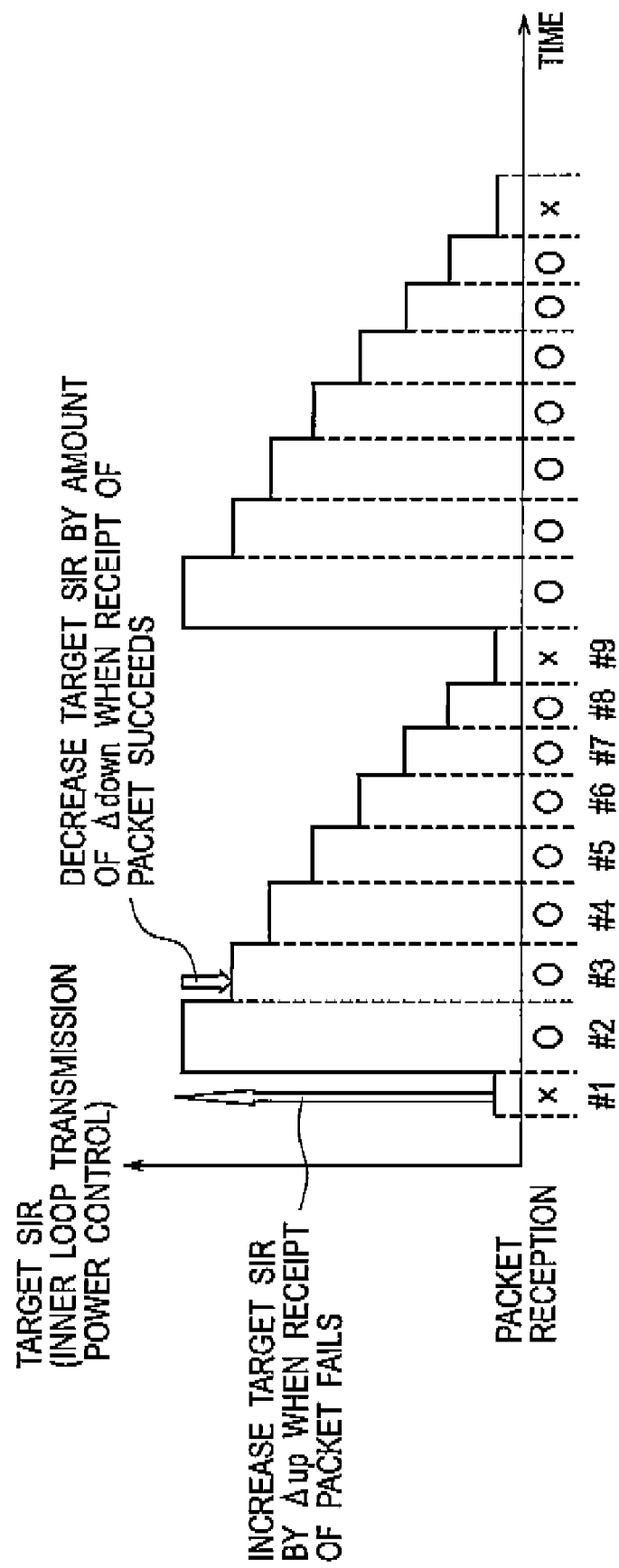
FIG. 4 is a diagram for describing a method of setting a target SIR used in the inner loop transmission power control in the conventional radio base station employing the EUL.
Figure 5:
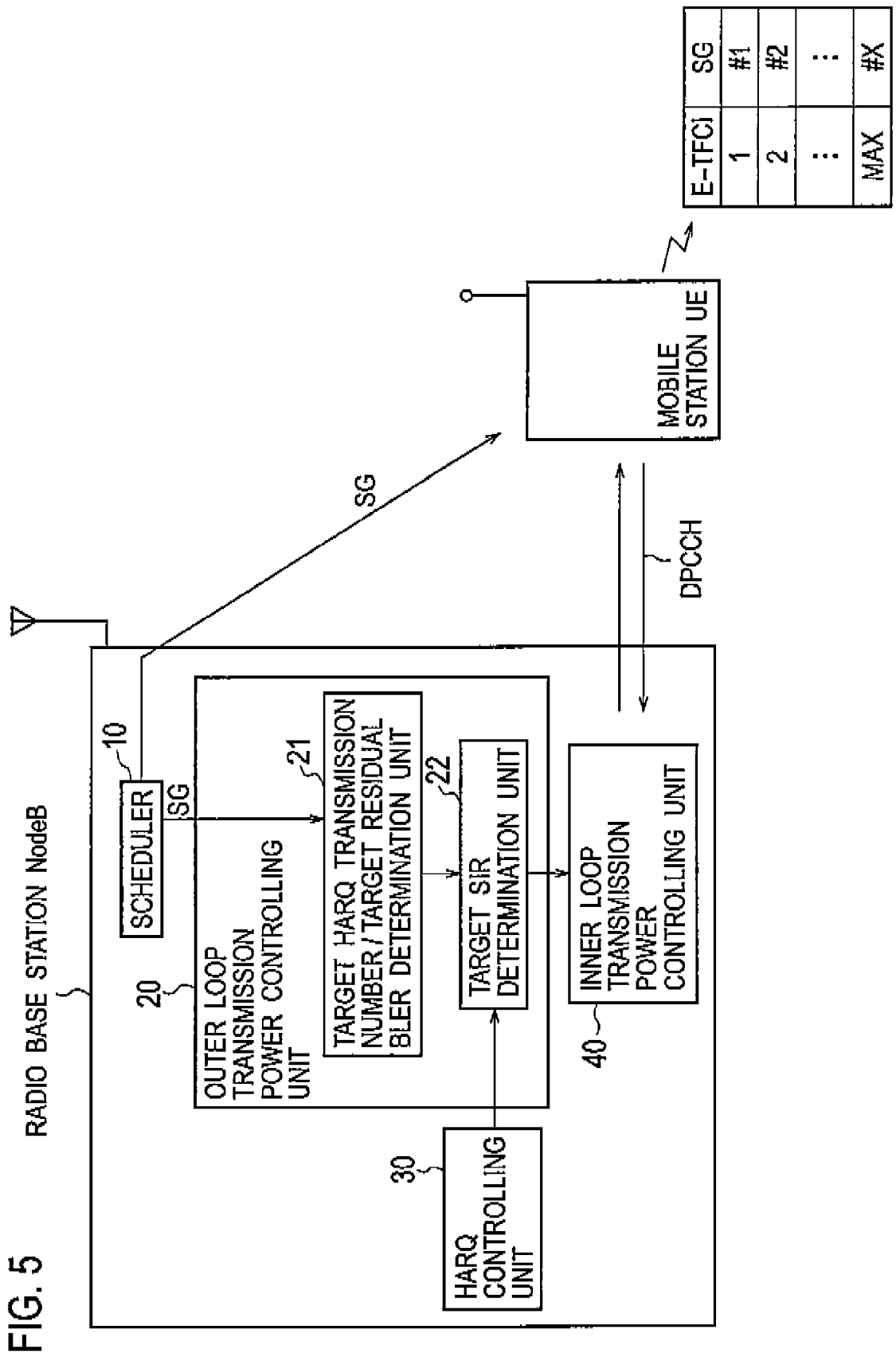
FIG. 5 is a functional block diagram of a radio base station in a mobile communication system according to the first embodiment of the present invention.

As shown in FIG. 5, the radio base station NodeB includes: a scheduler 10, an outer loop transmission power controlling unit 20, an HARQ controlling unit 30 and an inner loop transmission power controlling unit 40.

The scheduler 10 is configured to determine: a mobile station UE allowed to transmit the uplink packet; and an SG (granted value) to be notified to the mobile station UE, in each sub-frame (TTI). The scheduler 10 is configured then to notify the SG, to the mobile station UE via the E-AGCH or the E-RGCH in each sub-frame.

In addition, the scheduler 10 is configured to notify the determined SG, to the outer loop transmission power controlling unit 20.

The HARQ controlling unit 30 is configured to perform the HARQ retransmission control for the uplink packet transmitted by the mobile station UE.

The inner loop transmission power controlling unit 40 is configured to control the transmission power in the uplink dedicated physical control channel (DPCCH) by the inner loop transmission power control using a target reception quality (target SIR, for example). Hereinafter, a description will be given of an example in which a target SIR is used as the target reception quality.

The outer loop transmission power controlling unit 20 includes: a target HARQ transmission number/target residual BLER determination unit 21 and a target SIR determination unit 22.

The target HARQ transmission number/target residual BLER determination unit 21 is configured to determine "the target HARQ transmission number" and a "target residual BLER (target residual error rate)."

Here, the "target residual BLER" shows the ratio of the packets failed to be received by the radio base station NodeB even when transmitted by "the target HARQ transmission number," with respect to all packets (transport blocks) transmitted by the mobile station UE.

Specifically, the "target residual BLER" is a value to be calculated by "nem/N." Here, the "N" shows the number of all new transmission packets transmitted by the mobile station UE (retransmitted packets are not included). The "nem" shows the number of packets failed to be received by the radio base station NodeB even when transmitted "M times".

A specific method of determining "the target HARQ transmission number" and the "target residual BLER" will be described later. Here, the description is given based on the following assumption:

$$\text{target reception success rate} = \text{transmission rate}/\text{target HARQ transmission number } (M) \times (1 - \text{target residual BLER } (Y)).$$

Note that the conventional mobile communication system is based on the formula that:

$$\text{the target reception success rate} = \text{transmission rate} \times (1 - \text{target BLER}).$$

The target SIR determination unit 22 is configured to determine the aforementioned target SIR by performing an outer loop transmission power control using "the HARQ transmission number" and a "reception result" both received from the HARQ controlling unit 30.

Here, "the HARQ transmission number" indicates what number transmission in the HARQ retransmission control is the uplink packet transmission in the mobile station UE. Further, the "reception result" indicates a reception result of the uplink packet transmission (CRC: OK or CRC: NG).

In addition, the target SIR determination unit 22 is configured to determine the target SIR based on "the target HARQ transmission number" and a "target residual BLER," in addition to "the HARQ transmission number" and the "reception result."

In general, the target SIR tends to become too high in the mobile communication system performing the HARQ retransmission control, because the target SIR is increased by the amount of Δ up when the reception of the uplink packet is not successful in each HARQ process.

Figure 6:
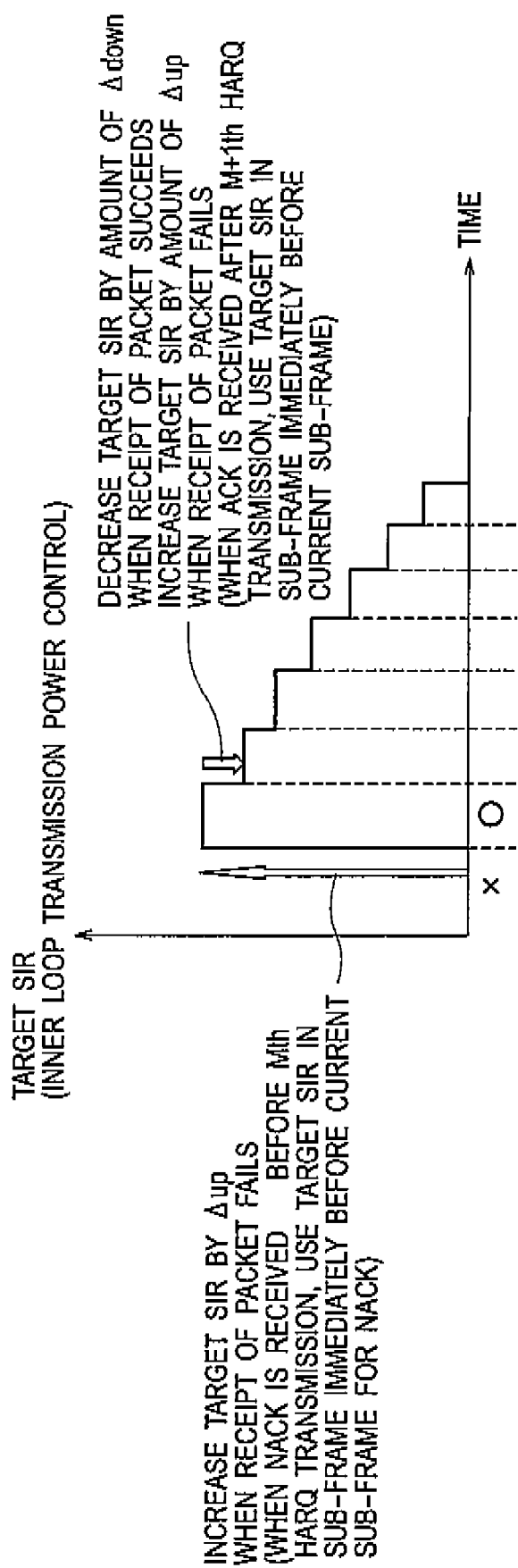
FIG. 6 is a diagram for describing a method of setting a target SIR used in the inner loop transmission power control in the radio base station according to the first embodiment of the present invention.

In this respect, as shown in FIGS. 6 and 7, in the mobile communication system according to the present embodiment, the target SIR determination unit 22 is configured to increase the target SIR for the uplink packet by the amount of Δ up (predetermined increment amount) in each sub-frame, when "the HARQ transmission number" is not less than "the target HARQ transmission number (M times)," and when the "reception result" shows "a reception is not successful in the HARQ transmission number (NACK)."

On the other hand, the target SIR determination unit 22 is configured not to change the target SIR for the uplink packet in each sub-frame when "the HARQ transmission number" is less than "the target HARQ transmission number (M times)," and also, the "reception result" shows "a reception is not successful in the HARQ transmission number (NACK)."

In addition, the target SIR determination unit 22 is configured to decrease the target SIR for the uplink packet by the amount of Δ down (predetermined decrement amount) in each sub-frame, when "the HARQ transmission number" is not larger than "the target HARQ transmission number (M times)," and when the "reception result" shows "a reception is successful in the HARQ transmission number (ACK)."

On the other hand, the target SIR determination unit 22 is configured not to change the target SIR for the uplink packet in each sub-frame, when the "the HARQ transmission number" is larger than "the target HARQ transmission number (M times),"and when the "reception result" shows "reception is successful in the HARQ transmission number (ACK)."

As a result, the target SIR determination unit 22 can adjust the target SIR so as to achieve a target reception success rate.

In addition, the benefit from the HARQ retransmission control can be obtained when the target HARQ transmission number is set to be not less than "twice." Thus, a lower target SIR can be set in this case. Moreover, the transmission power in an E-DPDCH can be set lower, so that the amount of the interference for other mobile stations UE can be reduced.

Here, it is assumed that that the relationship of Δ up and Δ down is set as follows (formula 2).

$$\Delta \text{ down} = (Y/(1-Y)) \times \Delta \text{ down} \quad \text{(formula 2)}$$

In this regard, "Y" indicates the target residual BLER.

Furthermore, the target SIR determination unit 22 may be configured not to change the target SIR in each sub-frame when the reception of control information is not successful in the E-DPCCH corresponding to the E-DPDCH (enhanced dedicated physical control channel corresponding to the enhanced dedicated physical data channel).

Moreover, the target SIR determination unit 22 may be configured to use a predetermined target SIR in each sub-frame, when the SG (granted value) notified by the radio base station NodeB is "Zero Grant (0) (in other words, the transmission of the E-DPDCH is requested to be stopped)."

Further, as shown in FIG. 5, the mobile station UE is configured to transmit the uplink packet at the transmission rate corresponding to the SG (granted value) notified by the radio base station NodeB.

Furthermore, the mobile station UE is configured to transmit the uplink packet by use of the transmission power in the E-DPDCH (enhanced uplink dedicated physical data channel). This transmission power in the E-DPDCH is determined based on the SG (granted value) notified by the radio base station NodeB and the transmission power controlled by the inner loop transmission power control in the DPCCH (uplink dedicated physical control channel).

Operations of Mobile Communication System According to First Embodiment of Present Invention With reference to FIGS. 8 to 14, a description will be given of operations of the mobile communication system according to the first embodiment of the present invention.

Firstly, with reference to FIG. 8, a description will be given of a first operation for updating a target SIR by the radio base station NodeB (target SIR determination unit 22) according to the first embodiment of the present invention. In this regard, the target SIR is used in the inner loop transmission power control.

Figure 8:
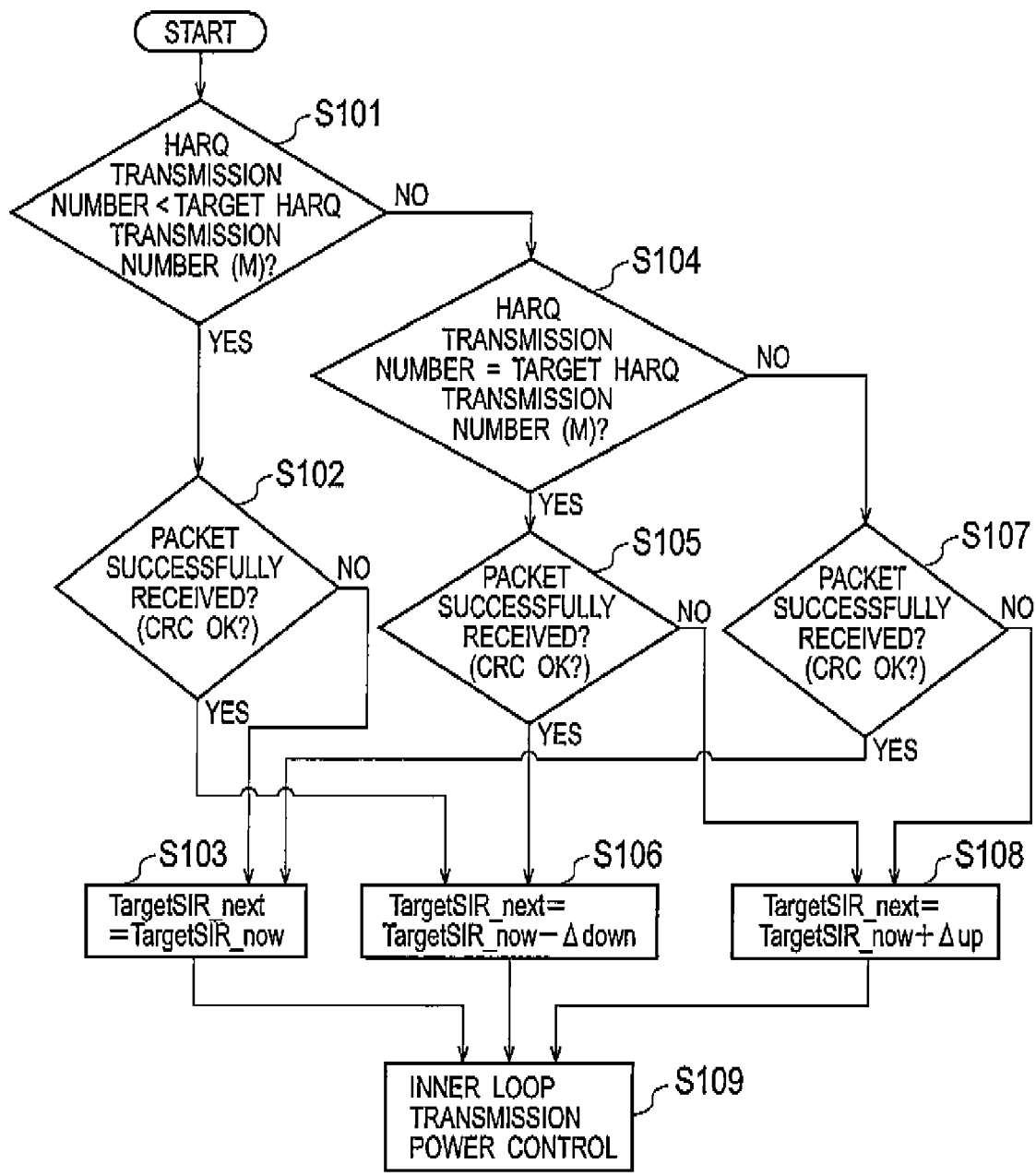
FIG. 8 is a flowchart showing operations for setting a target SIR used in the inner loop transmission power control in the radio base station according to the first embodiment of the present invention.

As shown in FIG. 8, in step S101, the target SIR determination unit 22 determines whether or not the HARQ transmission number (indicating what number transmission in the HARQ retransmission control is the uplink packet transmission in the mobile station UE) is smaller than "the target HARQ transmission number (M times)" in the current frame. Here, the HARQ transmission number is notified by the HARQ controlling unit 30.

When the target SIR determination unit 22 determines that the HARQ transmission number is smaller than "the target HARQ transmission number (M times)," in step S102, the target SIR determination unit 22 determines, based on the "reception result" notified by the HARQ controlling unit 30, whether or not the reception of the uplink packet in the current sub-frame is successful (CRC: OK).

Here, when the target SIR determination unit 22 determines that the reception of the uplink packet is successful, in step S106, the target SIR determination unit 22 decreases the target SIR used in the current sub-frame by the amount of Δ down and determines to use the decreased target SIR as the target SIR to be used in the next sub-frame.

On the other hand, when the target SIR determination unit 22 determines that the reception of the uplink packet is not successful, in step S103, the target SIR determination unit 22 determines to use the target SIR used in the current sub-frame as the target SIR to be used in the next sub-frame.

In addition, when the target SIR determination unit 22 determines that the HARQ transmission number is not smaller than "the target HARQ transmission number" in step S101, in step S104, the target SIR determination unit 22 determines whether or not the HARQ transmission number is the same as "the target HARQ transmission number (M times)".

When the target SIR determination unit 22 determines that the HARQ transmission number is the same as "the target HARQ transmission number (M times)," in step S105, the target SIR determination unit 22 determines whether or not the reception of the uplink packet in the current sub-frame is successful (CRC: OK).

Here, when the target SIR determination unit 22 determines that the reception of the uplink packet is successful, the target SIR determination unit 22 decreases the target SIR used in the current sub-frame by the amount of Δ down. Further, in step S106, the target SIR determination unit 22 determines to use the decreased target SIR in the next sub-frame as the target SIR.

On the other hand, when the target SIR determination unit 22 determines that the reception of the uplink packet is not successful, the target SIR determination unit 22 increases the target SIR used in the current sub-frame by the amount of Δ up. Further, in step S108, the target SIR determination unit 22 determines to use the increased target SIR as the target SIR in the next sub-frame.

Moreover, in step S104, when the target SIR determination unit 22 determines that the HARQ transmission number is not the same as "the target HARQ transmission number (M times)," in step S107, the target SIR determination unit 22 determines whether or not the reception of the uplink packet in the current sub-frame is successful (CRC: OK).

Here, when the target SIR determination unit 22 determines that the reception of the uplink packet is successful, the target SIR determination unit 22 determines to use the target SIR used in the current sub-frame as the target SIR to be used in the next sub-frame, in step S103.

On the other hand, when the target SIR determination unit 22 determines that the reception of the uplink packet is not successful, the target SIR determination unit 22 increases the target SIR used in the current sub-frame by the amount of Δ up. Further, in step S108, the target SIR determination unit 22 determines to use the increased target SIR as the target SIR in the next sub-frame.

In step S109, the inner loop transmission power controlling unit 40 performs the inner loop transmission power control for the transmission power in the DPCCH by use of the determined target SIR.

Secondly, with reference to FIG. 9, a description will be given of a second operation for updating a target SIR by the radio base station NodeB (target SIR determination unit 22) according to the first embodiment of the present invention. In this regard, the target SIR is used in the inner loop transmission power control.

Figure 9:
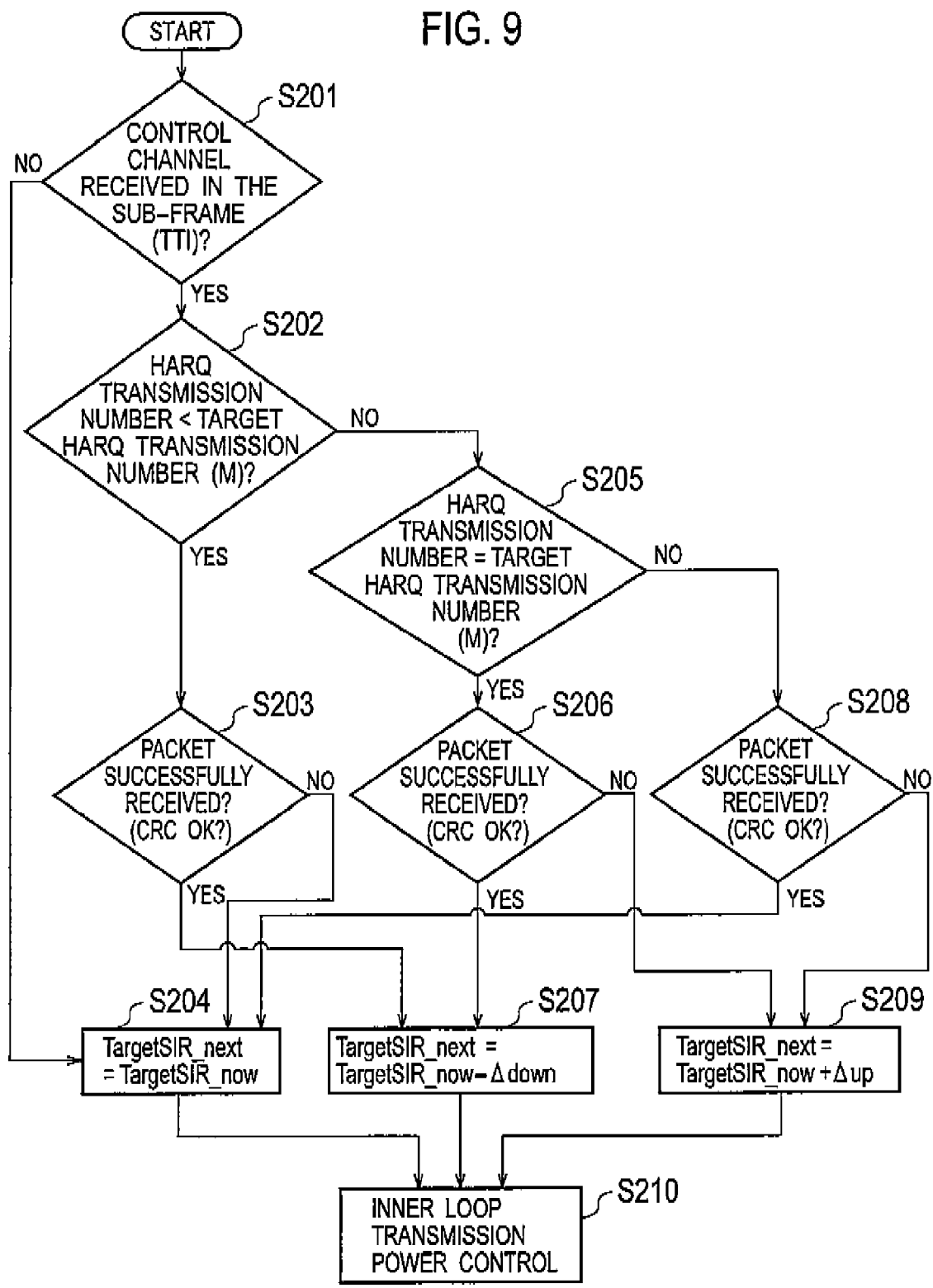
FIG. 9 is another flowchart showing operations for setting a target SIR used in the inner loop transmission power control in the radio base station according to the first embodiment of the present invention.

As shown in FIG. 9, in step S201, the target SIR determination unit 22 determines whether or not the reception of control information in an E-DPCCH corresponding to the E-DPDCH in the current subframe is successful.

When the target SIR determination unit 22 determines that the reception of the control information in the current sub-frame is successful, the second operation proceeds to step S202. On the other hand, when the target SIR determination unit 22 determines that the reception of the control information in the current sub-frame is not successful, the second operation proceeds to step S204.

Hereinafter, the operations in steps S202 to S210 are the same as those of the aforementioned steps S101 to S109.

Next, with reference to FIGS. 10 to 14, a description will be given of operations of the radio base station NodeB (the target HARQ transmission number/target residual BLER determination unit 21) to determine the target HARQ transmission number (M) and the target residual BLER determination (Y).

Figure 10:
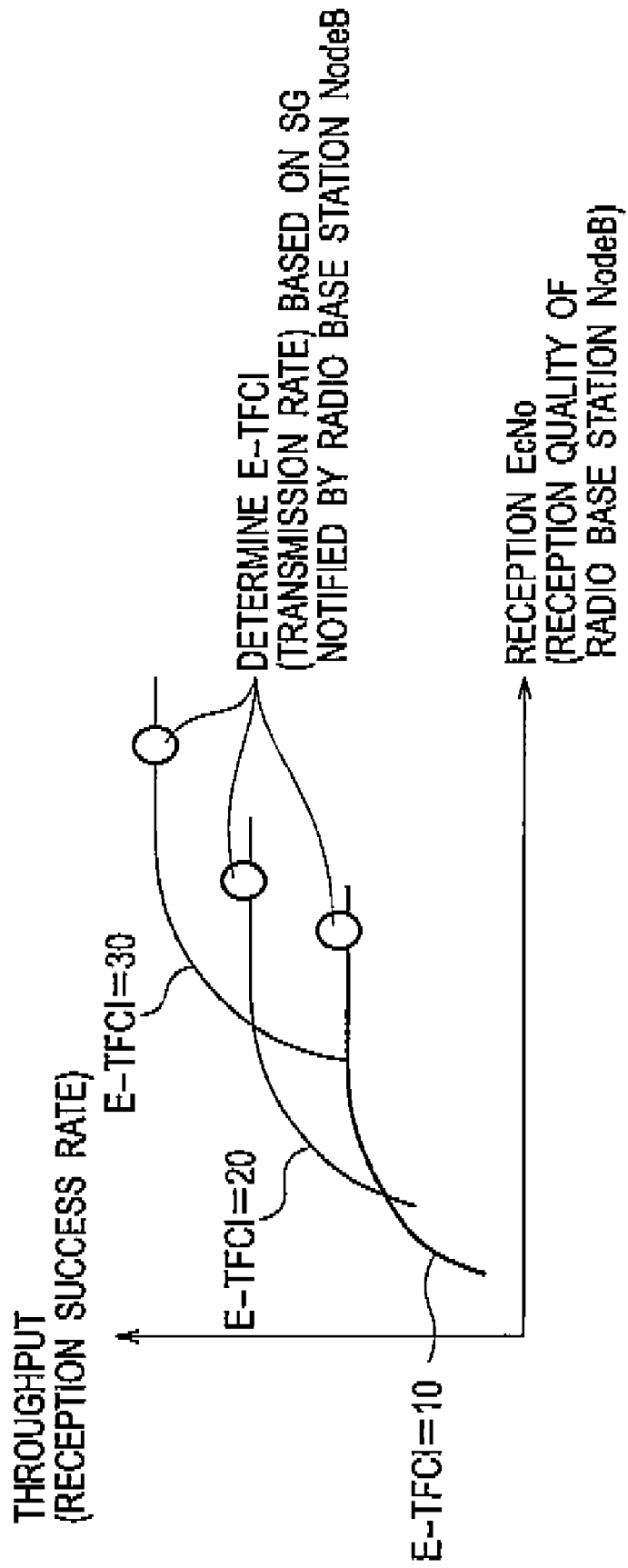
FIG. 10 is a diagram showing a concept in which a throughput and a reception quality of the radio base station can be adaptively controlled by changing the target HARQ transmission number and a target residual BLER in the mobile communication system according to the first embodiment of the present invention.

As shown in FIG. 10, the target HARQ transmission number/target residual BLER determination unit 21 can achieve a desired reception success rate (throughput) and a desired reception quality (reception EcNo) of the radio base station NodeB in any E-TFCI by appropriately adjusting the target HARQ transmission number (M) and the target residual BLER (Y).

In FIG. 10, the E-TFCI is determined based on the SG notified by the radio base station NodeB. Then, a transmission rate corresponding to the E-TFCI is determined to be the transmission rate used in the mobile station UE.

Here, this transmission rate corresponds to a reception success rate that can be achieved when the reception quality in the mobile station NodeB is extremely high.

In this regard, when the inner loop transmission power control and the outer loop transmission power control for the uplink DPCCH is not performed, the reception success rate and the reception quality of the radio base station NodeB take values corresponding to any one of points on the E-TFCI curves determined based on the SG notified by the radio base station NodeB in FIG. 10.

In contrast, the radio base station NodeB according to the present embodiment appropriately adjusts the target HARQ transmission number (M) and the target residual BLER determination (Y), and then performs the inner loop transmission power control and outer loop transmission power control. Accordingly, the reception success rate and the reception quality of the radio base station NodeB take values corresponding to a desired point on the E-TFCI curve determined based on the SG notified by the radio base station NodeB.

The operations of the radio base station NodeB in the aforementioned case will be described with reference to FIGS. 11 to 14.

Figure 11:
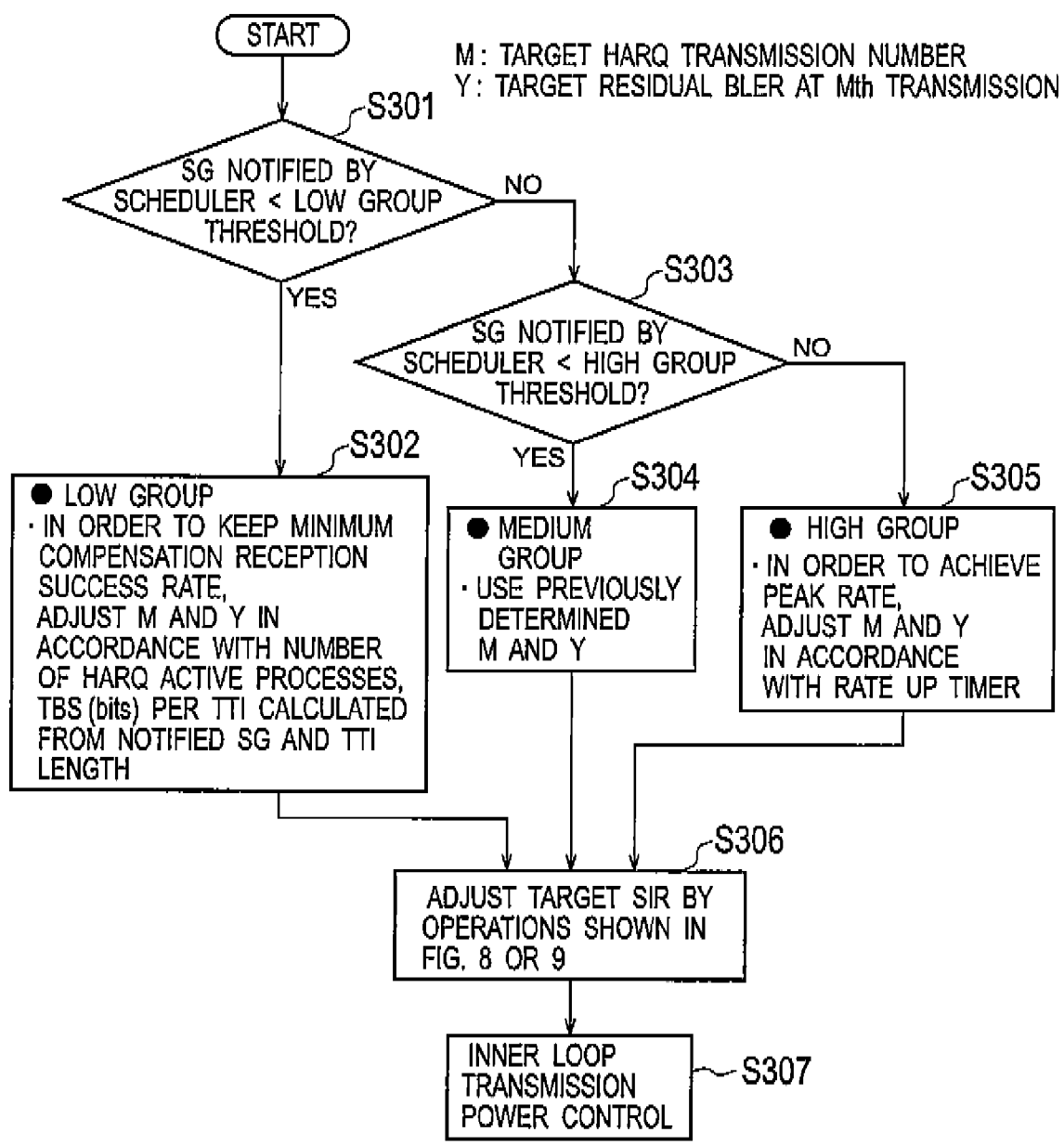
FIG. 11 is a flowchart showing operations for adjusting the target HARQ transmission number and the target residual BLER in the mobile communication system according to the first embodiment of the present invention.

As shown in FIG. 11, in step S301, the outer loop transmission power controlling unit 20 of the radio base station NodeB determines whether or not the latest SG notified by the scheduler 10 is smaller than a "low group threshold."

When the outer loop transmission power controlling unit 20 determines that the latest SG is smaller than the "low group threshold," in step S302, the outer loop transmission power controlling unit 20 determines a combination of the target HARQ transmission number (M) and the target residual BLER (Y), in accordance with a minimum guaranteed reception success rate, the number of HARQ active processes in the mobile station UE, the uplink packet size in the sub-frame unit (TTI) (TBS: Transport Block Size), and sub-frame length (for example, 2 ms or 10 ms).

More specifically, the outer loop transmission power controlling unit 20 stores therein a table managing combinations of "the numbers of target HARQ transmission times" and "target residual BLERs (Y)" as shown in FIG. 12.

In the table shown in FIG. 12, "trial numbers" are provided to respective combinations of "the numbers of target HARQ transmission times (M)" and "target residual BLERs (Y) in ascending order of values obtained in accordance with "1/M×(1−Y)."

Then, the outer loop transmission power controlling unit 20 selects a combination of "the target HARQ transmission numbers (M)" and a "target residual BLER (Y)" having the smallest "trial number" provided thereto from the combinations of "the target HARQ transmission numbers (M)" and "target residual BLERs (Y)." Here, these combinations make the following (formula 3) true.

$$((\text{The number of HARQ active processes}/8) \times \text{TBS corresponding to the notified SG}/M \times (1-Y))/\text{TTI length} \geq \text{minimum guaranteed reception success rate (kbps)}) \quad (\text{formula 3})$$

The selected combination is determined as the combination of "the target HARQ transmission number (M)" and a "target residual BLER (Y)" to be used for determining the target SIR.

In addition, in step S301, when the outer loop transmission power controlling unit 20 determines that the latest SG is not smaller than the "low group threshold," in step S303, the outer loop transmission power controlling unit 20 determines whether or not the latest SG is smaller than a "high group threshold".

When the outer loop transmission power controlling unit 20 determines that the latest SG is smaller than the "high group threshold," in step S304, the outer loop transmission power controlling unit 20 determines the combination of a predetermined target HARQ transmission number and target residual BLER to be the combination of "the target HARQ transmission number (M)" and "target residual BLER (Y)" to be used for determining the target SIR.

Here, the benefit from the HARQ retransmission control can be obtained when the target HARQ transmission number is set to be not less than "twice."

On the other hand, when the outer loop transmission power controlling unit 20 determines that the latest SG is not smaller than the "high group threshold," in step S305, the outer loop transmission power controlling unit 20 changes the combination of "the target HARQ transmission number (M)" and "target residual BLER (Y)" used for determining the target SIR, in each predetermined period.

More specifically, as shown in FIG. 13, the outer loop transmission power controlling unit 20 stores therein a table managing combinations of "the numbers of target HARQ transmission times (M)" and "target residual BLERs (Y)."

In the table shown in FIG. 13, "rate numbers" are provided respectively to combinations of "the numbers of target HARQ transmission times (M)" and "target residual BLERs (Y) in ascending order of values obtained in accordance with "1/M×(1−Y)." In addition, a "rate up timer (ms)" for measuring the aforementioned predetermined period is set for each of the combinations of "the numbers of target HARQ transmission times (M)" and "target residual BLERs (Y).

Then, in step S305, firstly, the outer loop transmission power controlling unit 20 selects a "rate number" corresponding to the previously set "initial rate number" from the "rate numbers" in the table shown in FIG. 13. The outer loop transmission power controlling unit 20 then determines the combination of "the target HARQ transmission number (M)" and the "target residual BLER (Y)" that correspond to the selected "rate number" to be the combination of "the target HARQ transmission number (M)" and the "target residual BLER (Y) for determining the target SIR.

Secondly, when a predetermined period of time measured by the "rate up timer" set for the determined combination of "the target HARQ transmission number (M)" and the "residual BLER (Y)" elapses, the outer loop transmission power controlling unit 20 selects a "rate number" corresponding to "the initial rate number plus 1," and then determines the combination of "the target HARQ transmission number (M)" and "target residual BLER (Y)" that correspond to the selected "rate number" to be the combination of "the target HARQ transmission number (M)" and the "target residual BLER (Y)" for determining the target SIR.

Note that the aforementioned operation is repeated in step S305 until the combination of "the target HARQ transmission number (M)" and the "target so residual BLER (Y)" that corresponds to the largest "rate number" is selected.

Figure 14:
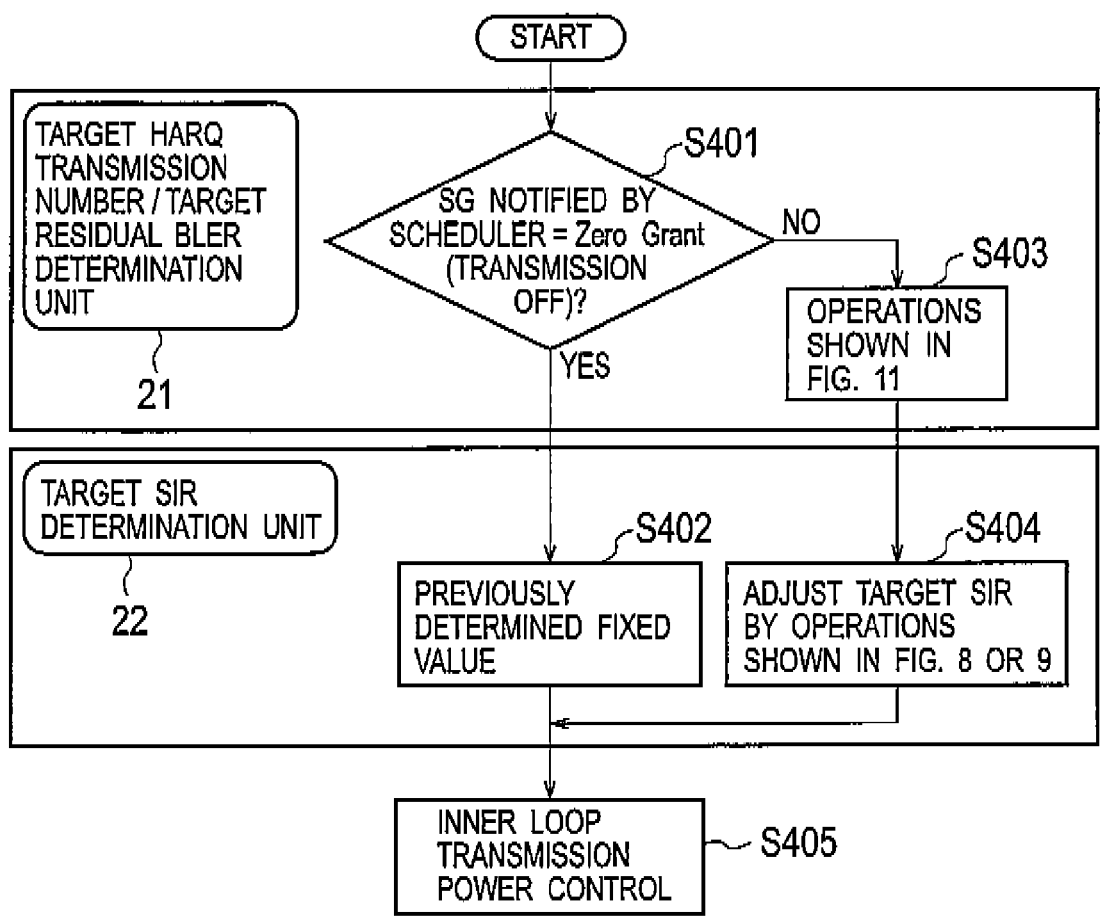
FIG. 14 is a flowchart for describing operations for adjusting the target HARQ transmission number and the target residual BLER, when the SG is a "zero grant" in the radio base station according to the first embodiment of the present invention.

In addition, as shown in FIG. 14, when the latest SG notified by the scheduler 10 is determined to be "Zero Grant" in step S401, the outer loop transmission power controlling unit 20 of the radio base station NodeB determines in step S402 to use a predetermined fixed value as the target SIR. Then, in step S405, the inner loop transmission power controlling unit 40 performs the inner loop transmission power control by use of the SIR target.

Specifically, when the latest SG notified by the scheduler 10 is determined to be "Zero Grant," that is, when the transmission of the uplink packet (except for SI) in the E-DPDCH is specified to be off, the mobile station UE does not transmit the uplink packet. Thus, the amount of the interference power for other mobile stations UE can be reduced by decreasing the target SIR and reducing the transmission power in the mobile station UE.

(Operation and Effects)

According to the mobile communication system according to the present embodiment, in the mobile communication system employing the EUL, it is possible to guarantee not only a transmission rate of an uplink packet in a mobile station UE, but also a reception success rate of the uplink packet in the radio base station NodeB.

Note that the operations of the mobile station UE and radio base station NodeB described above may be implemented by hardware, by a software module executed by a processor, or by a combination of both.

The software module may be provided in any form of storage medium such as a random access memory (RAM), a flash memory, a read only memory (ROM), an erasable programmable ROM (EPROM), an electronically erasable and programmable ROM (EEPROM), a register, a hard disk, a removable disk and a CD-ROM.

Such a storage medium is connected to the processor so that the processor can read and write information from and into the storage medium. Moreover, the storage medium may be integrated in the processor. Furthermore, the storage medium and the processor may be provided in an ASIC. The ASIC may be provided in a mobile station UE and a radio base station eNodeB. Moreover, the storage medium and the processor may be provided as discrete components in the mobile station UE and the radio base station eNodeB.

Hereinabove, the present invention has been described in detail by use of the embodiment. However, it is obvious to those skilled in the art that the present invention is not limited to the embodiment described herein. The present invention may be implemented as a modification and a variation, within the spirit and scope of the present invention defined by the scope of claims. Accordingly, the present specification aims to provide an exemplar description and does not limit the present invention in any way.

What is claimed is:

1. A mobile communication method in which a mobile station transmits an uplink packet at a transmission rate corresponding to a granted value notified by a radio base station, wherein a HARQ retransmission control is employed in a communication of the uplink packet transmitted from the mobile station to the radio base station;

the granted value indicates a ratio between a transmission power in an enhanced dedicated physical data channel for transmitting the uplink packet, and a transmission power in an uplink dedicated physical control channel; and the mobile communication method comprises:

controlling, at the radio base station, the transmission power in the uplink dedicated physical control channel by use of an inner loop transmission power control based on a target reception quality;

transmitting, at the mobile station, the uplink packet, at the transmission power in the enhanced dedicated physical data channel, the transmission power being determined based on the granted value and the transmission power in the uplink dedicated physical control channel; and determining, at the radio base station, the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission.

2. A mobile communication system in which a mobile station transmits an uplink packet at a transmission rate corresponding to a granted value notified by a radio base station, wherein a HARQ retransmission control is employed in a communication of the uplink packet transmitted from the mobile station to the radio base station;

the granted value indicates a ratio between a transmission power in an enhanced dedicated physical data channel for transmitting the uplink packet, and a transmission power in an uplink dedicated physical control channel;

the radio base station comprises:

an inner loop transmission power controlling unit configured to control the transmission power in the uplink dedicated physical control channel by use of an inner loop transmission power control based on a target reception quality; and an outer loop transmission power controlling unit configured to determine the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission; and the mobile station is configured to transmit the uplink packet by use of the transmission power in the enhanced dedicated physical data channel, the transmission power being determined based on the granted value and the transmission power in the uplink dedicated physical control channel.

3. The mobile communication system according to claim 2, wherein the outer loop transmission power controlling unit is configured to improve the target reception quality by a predetermined increment amount in each of a sub-frame, when the HARQ transmission number is not less than a target HARQ transmission number, and when the reception result indicates that a reception of the uplink packet is not successful, and the outer loop transmission power controlling unit is configured not to change the target reception quality in each of the sub-frame, when the HARQ transmission number is less than the target HARQ transmission number, and when the reception result indicates that the reception of the uplink packet is not successful.

4. The mobile communication system according to claim 2, wherein the outer loop transmission power controlling unit is configured to degrade the target reception quality by a predetermined decrement amount in each of a sub-frame, when the HARQ transmission number is not larger than a target HARQ transmission number, and when the reception result indicates that the reception of the uplink packet is successful, and the outer loop transmission power controlling unit is configured not to change the target reception quality in each of the sub-frame, when the HARQ transmission number is larger than the target HARQ transmission number, and when the reception result indicates that the reception of the uplink packet is successful.

5. The mobile communication system according to claim 2, wherein the outer loop transmission power controlling unit is configured not to change the target reception quality in each of a sub-frame, when a reception of control information in an enhanced dedicated physical control channel corresponding to the enhanced dedicated physical data channel is not successful.

6. The mobile communication system according to claim 2, wherein the outer loop transmission power controlling unit is configured to determine the target reception quality based on a target HARQ transmission number and a target residual error rate, the target residual error rate showing a ratio of packets failed to be received by the radio base station even when transmitted by the target HARQ transmission number, with respect to the all packets transmitted by the mobile station.

7. The mobile communication system according to claim 6, wherein the outer loop transmission power controlling unit is configured to determine a combination of the target HARQ transmission number and the target residual error rate, in accordance with a minimum guaranteed reception success rate, the number of HARQ active processes in the mobile station, an uplink packet size in a sub-frame unit, and a sub-frame lengths when the granted value notified by the radio base station is smaller than a low group threshold.

8. The mobile communication system according to claim 6, wherein the outer loop transmission power controlling unit is configured to use a predetermined combination of the target HARQ transmission number and the target residual error rate, when the granted value notified by the radio base station is larger than a low group threshold but smaller than a high group threshold.

9. The mobile communication system according to claim 6, wherein the outer loop transmission power controlling unit is configured to change a combination of the target HARQ transmission number and the target residual error rate in each of a predetermined period, when the granted value notified by the radio base station is larger than a high group threshold.

10. The mobile communication system according to claim 6, wherein the outer loop transmission power controlling unit is configured to use a predetermined target reception quality, when the granted value notified by the radio base station indicates a request to stop a transmission in the enhanced dedicated physical data channel.

11. A radio base station used in a mobile communication system in which a mobile station transmits an uplink packet at a transmission rate corresponding to a granted value notified by the radio base station, wherein a HARQ retransmission control is employed for a communication of the uplink packet transmitted from the mobile station to the radio base station;

the granted value indicates a ratio between a transmission power in an enhanced dedicated physical data channel for transmitting the uplink packet, and a transmission power in an uplink dedicated physical control channel;

the mobile station is configured to transmit the uplink packet by use of the transmission power in the enhanced dedicated physical data channel, the transmission power being determined based on the granted value and the transmission power in the uplink dedicated physical control channel; and the radio base station comprises:

an inner loop transmission power controlling unit configured to control the transmission power in the uplink dedicated physical control channel by use of an inner loop transmission power control based on a target reception quality; and an outer loop transmission power controlling unit configured to determine the target reception quality, by use of an outer loop transmission power control based on a HARQ transmission number and a reception result of an uplink packet transmission of the HARQ transmission number, the HARQ transmission number indicating what number transmission in the HARQ retransmission control is the uplink packet transmission.

12. The radio base station according to claim 11, wherein the outer loop transmission power controlling unit is configured to improve the target reception quality by a predetermined increment amount in each of a sub-frame, when the HARQ transmission number is not less than a target HARQ transmission number, and when the reception result indicates that a reception of the uplink packet is not successful, and the outer loop transmission power controlling unit is configured not to change the target reception quality in each of the sub-frame, when the HARQ transmission number is less than the target HARQ transmission number, and when the reception result indicates that the reception of the uplink packet is not successful.

13. The radio base station according to claim 11, wherein the outer loop transmission power controlling unit is configured to degrade the target reception quality by a predetermined decrement amount in each of a sub-frame, when the HARQ transmission number is not larger than a target HARQ transmission number, and when the reception result indicates that the reception of the uplink packet is successful, and the outer loop transmission power controlling unit is configured not to change the target reception quality in each of the subframe, when the HARQ transmission number is larger than the target HARQ transmission number, and when the reception result indicates that the reception of the uplink packet is successful.

14. The radio base station according to claim 11, wherein the outer loop transmission power controlling unit is configured not to change the target reception quality in each of a sub-frame, when a reception of control information in an enhanced dedicated physical control channel corresponding to the enhanced dedicated physical data channel is not successful.

15. The radio base station according to claim 11, wherein the outer loop transmission power controlling unit is configured to determine the target reception quality based on a target HARQ transmission number and a target residual error rate, the target residual error rate showing a ratio of packets failed to be received by the radio base station even when transmitted by the target HARQ transmission number, with respect to the all packets transmitted by the mobile station.

16. The radio base station according to claim 15, wherein the outer loop transmission power controlling unit is configured to determine a combination of the target HARQ transmission number and the target residual error rate, in accordance with a minimum guaranteed reception success rate, the number of HARQ active processes in the mobile station, an uplink packet size in a sub-frame unit, and a sub-frame length, when the granted value notified by the radio base station is smaller than a low group threshold.

17. The radio base station according to claim 15, wherein the outer loop transmission power controlling unit is configured to use a predetermined combination of the target HARQ transmission number and the target residual error rate, when the granted value notified by the radio base station is larger than a low group threshold but smaller than a high group threshold.

18. The radio base station according to claim 15, wherein the outer loop transmission power controlling unit is configured to change a combination of the target HARQ transmission number and the target residual error rate in each of a predetermined period, when the granted value notified by the radio base station is larger than a high group threshold.

19. The radio base station according to claim 15, wherein the outer loop transmission power controlling unit is configured to use a predetermined target reception quality, when the granted value notified by the radio base station indicates a request to stop a transmission in the enhanced dedicated physical data channel.

* * * * *